April 29, 1969     R. A. PROCTOR     3,440,697

BUCKLES FOR SAFETY BELTS

Filed Aug. 15, 1966     Sheet 1 of 3

Inventor:
Ronald Allan Proctor
BY Baldwin, Wight, Diller & Brown
Attorneys

April 29, 1969   R. A. PROCTOR   3,440,697
BUCKLES FOR SAFETY BELTS
Filed Aug. 15, 1966   Sheet 3 of 3

Inventor:
Ronald Allan Proctor
By Baldwin Wight Diller & Brown
Attorneys

United States Patent Office 3,440,697
Patented Apr. 29, 1969

3,440,697
BUCKLES FOR SAFETY BELTS
Ronald Allan Proctor, Woking, England, assignor to Britax (London) Limited, Byfleet, England, a corporation of the United Kingdom
Filed Aug. 15, 1966, Ser. No. 572,269
Claims priority, application Great Britain, Aug. 20, 1965, 35,822/65
Int. Cl. A44b 11/00
U.S. Cl. 24—230         22 Claims

ABSTRACT OF THE DISCLOSURE

This disclosure relates to a safety belt buckle comprised of a one-piece base plate having upstanding sides and a pivotable one-piece latch plate overlying the base plate, the latch plate having a projection at each side thereof, and the sides of the base plate being down turned toward the latch plate and defining abutment shoulders in contact with the projections whereby the latch plate is restrained from moving in a direction beyond the shoulders. The latch plate further includes a tail directed upwardly toward a cover of the buckle, and biasing means are provided between the cover and the tongue for normally urging the latch plate toward its locked position.

---

This invention relates to buckles for safety belts used in motor vehicles, aircraft and other forms of conveyance. A safety belt buckle comprises two parts which are locked together when the belt is in use and separated to release the belts. Among the many requirements are those that the two parts of the buckle may be locked together and released simply and easily, that the locking or engagement of the two parts shall be sufficiently strong to withstand high impact loadings that may be put upon them and that the buckle shall have a neat appearance and be of compact light construction.

According to the present invention a safety belt buckle comprises a housing part having a base plate, a latch plate pivotally mounted to the base plate, the side of the latch plate facing the base plate presenting a latching surface and said latch plate having a tail extending from its inner edge and inclined away from the base plate, means biasing the latch plate for pivotal movement to move the latching surface towards the base plate of the housing part, a tongue insertable into the housing part between the latch plate and the base plate, the tongue having an abutment surface engageable with the latching surface to lock the tongue against withdrawal, and manually operable release means acting on the tail to pivot the latch plate against the biasing means thereby effecting movement of the latching surface away from the base plate and out of engagement with the abutment surface of the tongue.

A latch plate may be pivotally mounted to the base about a fulcrum transversely located at or adjacent the inner edge of the latch plate. The inner edge of the latch plate may provide the fulcrum transversely across the base plate or alternatively, a pair of abutments projecting from the lower surface of the latch plate adjacent its inner edge and bearing on the base plate, may provide the fulcrum.

The outer end edge of the latch plate may be coincident with an end edge of the base plate and the inner end edge(s) of the latch plate may be turned over to engage in a transverse slot in the base plate, the engagement of the end edges in the slot serving to hold the latch plate in the housing against withdrawal in a longitudinal direction. With such an arrangement spring biasing means may be provided to act between the tail of the latch plate and the base plate of the housing part.

To safeguard against accidental disengagement of the tongue from the housing, particularly under impact loading, it is important that the latching surface(s) of the latch plate should positively engage with the abutment surface(s) of the tongue. Conveniently the abutment surface(s) is provided by a face edge of a slot stamped out of the tongue which is in the form of a plate. Thus the face edge is at right angles to the faces of the tongue and, when the latter is engaged in the housing, to the surface of the base plate. In these circumstances the latching surface(s) should be inclined, when the latch is in its operative position at an angle of between 90° and 92° to the base plate and preferably at an angle of 91°. This ensures a positive lock between the latching surface(s) of the latch plate and the abutment surface of the tongue but at the same time does not prevent binding between said surfaces when the latch plate is pivoted to its inoperative position, even when the tongue is under tension.

Safety belt buckles in accordance with the present invention are now described with reference to the accompanying drawings in which.

Figure 1:
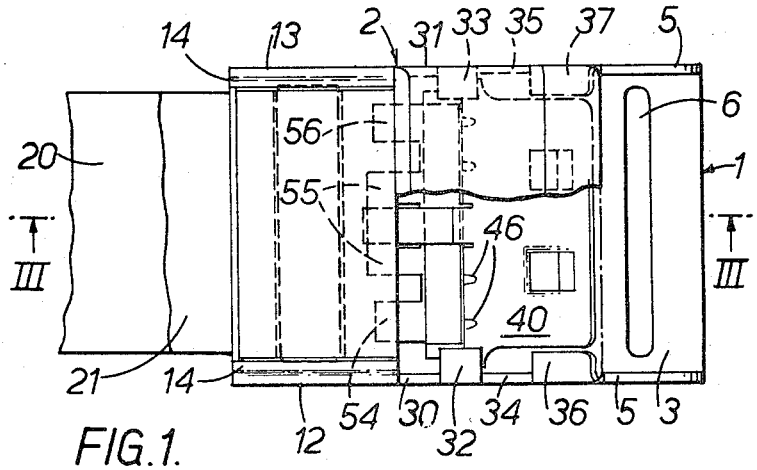
FIGURE 1 shows a plan view, of one embodiment of a buckle with parts broken away, the tongue of the buckle being shown engaged with the housing part of the buckle.
Figure 2:
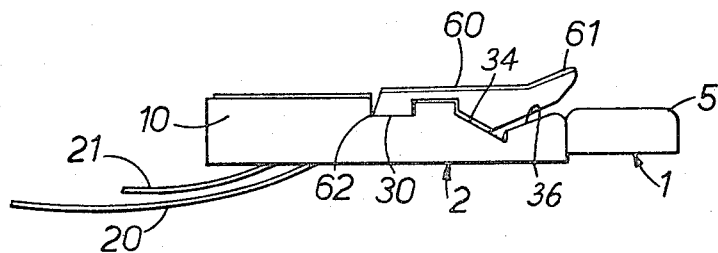
FIGURE 2 is a side elevation of the buckle.
Figure 3:
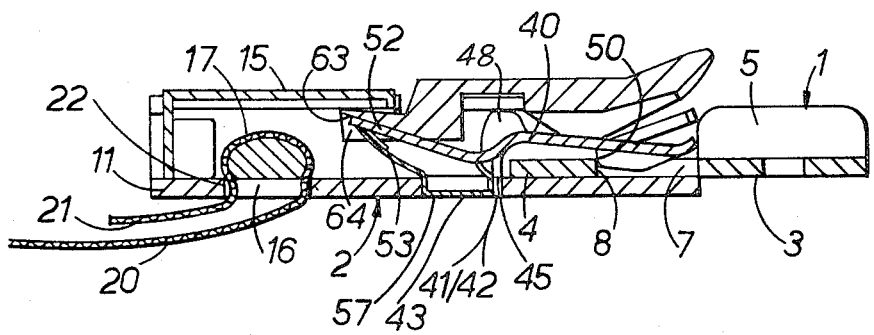
FIGURE 3 is a longitudinal section along the line III—III of FIGURE 1.
Figure 4:
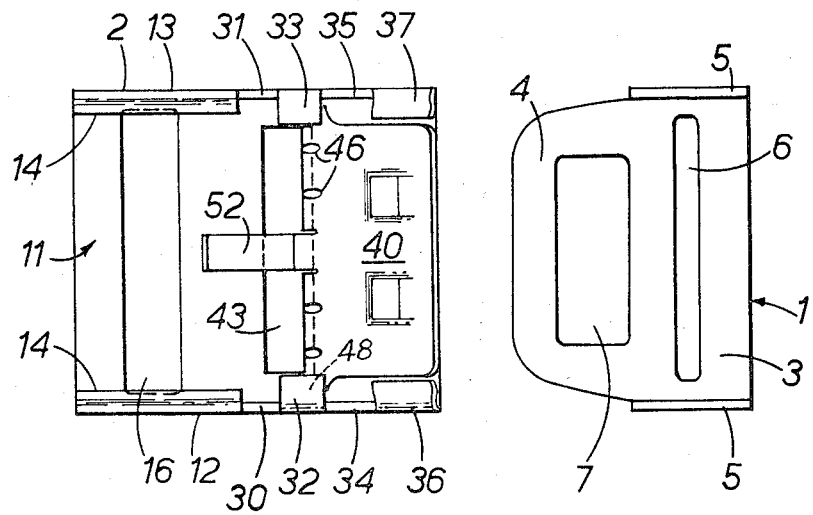
FIGURE 4 is an exploded plan view of the tongue and housing part the latter being stripped to show only the main body member and a latching plate.

Referring to FIGURES 1 and 4, the buckle is in two parts, namely a tongue 1 and a housing 2. The tongue is in the form of a plate having at its outer end 3 a width substantially the same as that of the housing part 2 and at its inner end 4 a width less than that of the housing part 2. The inner corners of the inner part 4 of the tongue are rounded to facilitate easy insertion of the tongue into the housing.

The side edges of the tongue at its outer part 3 are bent up in the form of flanges 5. These serve to give a neat appearance to the final buckle assembly and also provide flat surfaces facilitating the holding of the tongue between the thumb and fore-finger when it is inserted into the housing part 2.

A slot 6 is cut in the tongue 1 to receive one end of a length of safety belt the other end of which is attached to the vehicle either directly or indirectly through a storage reel. Alternatively, a belt may be simply passed through the slot 6, the belt at its ends being attached to anchorages at the top and bottom of a door pillar of a motor vehicle. An aperture 7 is also cut in the tongue, a face edge 8 of which aperture provides an abutment surface to be engaged by a latching surface of a latch piece, described in detail hereinafter.

The housing part comprises a main body member 10 the left hand end, as seen in FIGURE 1, being the belt end and the right hand end being the tongue end. The body member 10 is in the form of a base plate 11 the opposite side edges of which are turned up as side walls 12, 13. At the belt end of the housing 2 the top edges of the flanges 12 and 13 are turned over inwardly to provide ledges 14 disposed parallel to and spaced above or from the base plate 11.

A cover 15 snugly engages under these ledges 14. An aperture 16 is cut in the base plate 11 opposite the cover 15 and transversely located in general register with the aperture 16 is a belt bar 17. This bar 17 is loosely contained in the space defined by the base plate 11, side walls 12 and 13 and cover 15, and the end of a safety belt 20 is looped around it, the free and unattached end of that belt being indicated at 21. At its other end the belt 20 is anchored to the vehicle or to a storage reel mounted to the vehicle. The looping of the belt 20 about the bar 17 is a known arrangement and when the belt 20 is under tension in a direction generally parallel to the plane of the base plate 11 the belt is firmly held by being trapped between the bar 17 and an edge 22 of the aperture 16. The effective length of the belt may be shortened simply by pulling on the free end 21 whereupon the bar 17 rocks about its longitudinal axis such that there is no trapping of the belt against the edge 22. The effective length of the belt 20 may be increased by pulling on the belt running back to the anchorage point in a direction substantially normal to the base plate 11; the bar 17 again rocking about its longitudinal axis to allow the belt to slip over it without being trapped or nipped against an edge of the aperture 16.

The upstanding side walls 12, 13 have cut outs 30, 31 in their top edges approximately midway along their lengths and on the tongue side of these cutouts the top edges of the side walls 12 and 13 are turned inwardly to form ears 32, 33 spaced from but parallel to the base plate 11. On the tongue side of these ears 32 and 33 further cutouts 34 and 35 are formed in the side walls 12 and 13 and the base lines of these cutouts are inclined downwardly towards the base plate 11. Inclined lugs 36 and 37 are provided at the tongue end of the housing 2 by folding over inwardly the top edges of the side walls 12 and 13 about inclined fold lines.

A latch plate 40 is pivotally mounted to the base plate 11 by having its inner transverse edges 41, 42 turned down to engage in an aperture 43. These edges 41, 42 stop short of the side edges of the latch plate so leaving shoulders 45 which rest upon the top surface of the base plate 11. The shoulders thus provide a hinge for the latch plate and it is constrained against withdrawal in the longitudinal direction of the base plate 11 by the engagement of the turned edges 41, 42 against the transverse edge of the aperture 43.

To strengthen the latch plate in the region of folding over of the edges 41, 42 ribs and grooves 46 are formed.

Coincident with the shoulders 45 are upstanding arcuate lugs 48 which are located under the inturned ears 32 and 33 of the main body 10.

The overall width of the latch plate 40 is less than the spacing between the edges of the lugs 36 and 37. Thus when the latch plate is pivoted or rocked it can move up past these lugs to move latching surfaces 50 away from the base plate 11. The latching surfaces 50 are provided by the face edges of two indentations stamped in the latch plate 40. The angle formed by these latching surfaces when in their operative position towards the base plate 11 is important if secure engagement is to be obtained with the abutment surface 8 of the tongue 1. It is found that the most suitable angle is 91°. This question of the angle of the latching surfaces 50 is discussed in detail hereinafter.

Extending rearwardly towards and under the cover 15 is a tail 52 of the latchplate. This tail is bowed or inclined upwardly away from the base plate 11 and is acted upon by a strip spring 53. The spring 53 serves to bias the tail upwardly away from the base plate 11 whereby the latching surfaces 50 are biased downwardly towards the base plate 11.

The spring 55 is divided into two strips 54 and 56 and a U-shaped piece 55 with its cross piece lying underneath the tail 52 of the latch plate 40. The four strips 54, 55 and 56 are integral with and extend from a sole 57 fitted within the aperture 43. This sole serves the dual purpose of mounting and locating the spring strips 54, 55 and 56 and also of locating the turned edges 41 and 42 of the latch plate.

A release handle 60 hides from external view all the latching mechanism and ancillary components hereinbefore described. This release handle comprises a plate formed with an upturned free end 61 under which the fingers of a user may be placed to pivot the handle about edges 62 lying in the cutouts 30 and 31. A head 63 of the handle lies under the cover 15 and is recessed at 64 to accommodate the tail 52 of the latch plate. Thus by lifting up on the edge 61 of the release handle the head 63 is moved down towards the base plate 11 pushing down on the tail 52 of the latch plate so that the latching surfaces thereof are moved up away from the base plate 11.

The tongue 1 is engaged in the housing simply by pushing the tongue between the latching plate 40 and the base plate 11. The inclined tabs 36 and 37 facilitate the correct positioning of the tongue under the latch plate.

The latch pivots and rides up over the tongue until the latching surfaces 50 can snap down behind the abutment surface 8 of the tongue under the bias of the spring 53. The tongue is now positively locked within the housing and cannot be withdrawn until the release handle is lifted by lifting up the edge 61. When this occurs as hereinbefore described the latching surfaces 50 are moved out of engagement with the abutment surface 8. The tongue 1, when this disengagement is effected, cannot move away from the base plate 11 with the latch plate because it is engaged under the inturned lugs 36 and 37. It will be appreciated that movement of the release handle 60 to cause disengagement and release of the tongue 1 is against the bias of the spring 53 because the strips 54 and 56 thereof bear against the head 63.

The buckle described above with reference to FIGURES 1 to 4 has a latch release mechanism in the form of a release handle pivoted against the bias of a release spring. It will be appreciated that this release handle is only one example of many forms of manually operable release mechanisms which may be employed. For example, instead of using a release handle a fixed cover plate may be provided over the latching mechanism and a simple press button may be located in register with the tail of the latch plate and exposed through an aperture in the cover. Thus by pressing down on the button the latch plate may be caused to pivot. These comments concerning the construction of release mechanism equally apply to the embodiment of a buckle now to be described.

Figure 5:
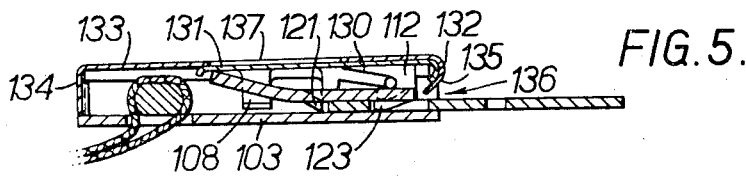
FIGURE 5 is a longitudinal section of a second embodiment of buckle.
Figure 6:
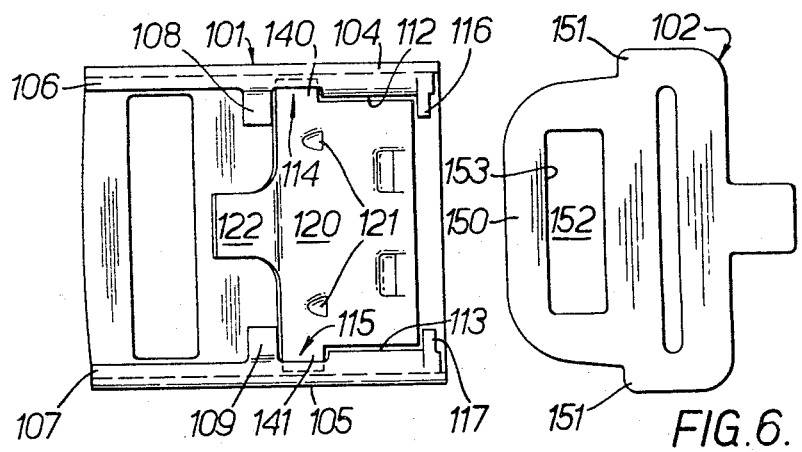
FIGURE 6 is an exploded plan view of the tongue and housing part of the buckle of FIGURE 5, the housing part being stripped to show only the main body member of the latch plate.

Referring now to FIGURES 5 and 6, these show a second embodiment of safety belt buckle according to the present invention. The buckle is in two parts, a housing part 101 and a tongue 102. The housing part 101 comprises a base plate 103, the longitudinal side edges of which are turned out to provide side walls 104, 105. At the top edges the side walls are turned over inwardly to provide flanges 106 and 107. These flanges are spaced from, i.e. above, and parallel to the base plate 103. Latch locating lugs 108 and 109 extend downwardly towards the base plate 103 from the flanges 106 and 107 respectively. As can be seen in FIGURES 5 and 6 these lugs are located substantially midway between the ends of the housing part 101. Latch load bearing lugs 112 and 113 also extend downwardly from the flanges 106 and 107 respectively. As can be seen in FIGURE 6 these are located towards the tongue end, i.e. the end into which the tongue is inserted, of the housing part 101, and are spaced from the locating lugs 108 and 109 leaving gaps 114 and 115 respectively.

Adjacent the tongue end of housing part 101 are pivot pins 116 and 117 integral with the flanges 106 and 107 extending towards each other coaxially and spaced from the base plate 103.

A latch plate 120 is pivotally mounted within the housing part 101, on a pair of abutment feet 121 projecting from its lower surface. This lower surface of the latch place 120 is the surface facing the base plate 103. A tail 122 extends from the inner or rear edge of the latch plate 120 upwardly and away from the base plate 103.

Latching surfaces 123 are provided by the face edges of two indentations stamped in the latch plate. The depth of these indentations is substantially the same as the abutment feed 121 so that in its normal operative position the latch plate 120 lies parallel to but spaced above the base plate 103.

A spring bias 130 is provided between the latch plate 120 and a release lever plate 131 which, as can be seen in FIGURE 5, overlies the latch plate. This release plate 131 at its forward end is curled round as indicated 132 to embrace the pivot pins 116.

A cover plate 133 overlies the flanges 106 and 107 and at its rear edge is turned downwardly to provide an end wall 134 of the housing part 101. At its forward end 135 the cover 133 is curled over the forward end of the release plate 131. As can be seen in FIGURE 5 this forward end 135 of the cover 133 does not extend down to the abse plate 133 but a mouth 136 is left to receive the tongue 102.

Access to the release plate 131 is provided through an aperture 137 in the cover 133.

To pivot the latch plate 120 against the bias of the spring 130 the release plate 131 is simply pressed down and as it bears on the tail 121 of the latch so the latch is pivoted.

Location of the latch 120 against longitudinal movement is provided by ears 140 and 141 which are received in the gaps 114 and 115 between the lugs 108 and 112, and 109 and 113 respectively.

A safety belt is attached to the housing part 101 in the manner hereinbefore described with reference to FIGURES 1 to 4.

The tongue 102 comprises a flat plate which at its forward end 150, which is the end which is inserted into the housing part 101, is of reduced width. Thus shoulders 151 are provided to limit movement of the tongue into the housing part 101. A slot 152 is cut in the tongue and a face edge 153 provides an abutment surface which, when the tongue is inserted in the housing part, engages with the latching surface 123.

A saftety belt is attached to the tongue 103 in the manner hereinbefore described.

In safety belt buckles the latching surface of the latch plate and the abutment surface of the tongue, which surfaces engage to hold the tongue in the housing part, are usually disposed parallel to each other and at right angles to the faces of the tongue and surface of the housing part. We have found that the angle of the latching surface is an important feature and by suitable choice of angle it can be arranged for the latching plate, when the buckle is under tension, to be subjected to zero torque, a closing moment or an opening moment. In the latter instance maintenance of the latch plate in a locking position essentially depends upon the spring bias applied to the latch plate.

Figure 7:
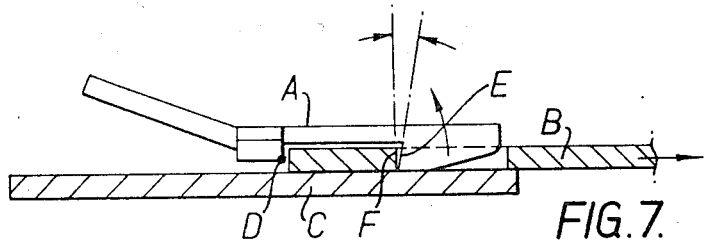
FIGURES 7, 8 and 9 are schematic views, on enlarged scale, showing in detail two different forms of engagement between the tongue and the latch plate.
Figure 8:
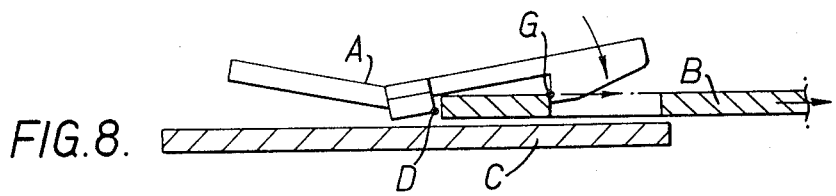
Figure 9:
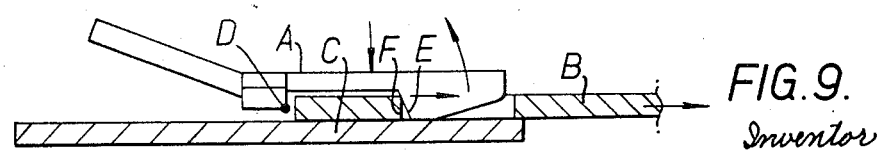

Referring to FIGURES 7, 8 and 9, these schematically illustrate on enlarged scale, the three components—latch plate, tongue and base plate, by the references A, B and C respectively.

The effective fulcrum or pivot point of the latch A is indicated at D. It is to be understood that in the construction of buckles described hereinbefore and illustrated in FIGURES 1–6, the latch plate does not have a fixed pivot point in the sense, e.g. that it is mounted on a pivot pin. When the latch plate is under load it may have a fulcrum different from that when it is pivoted to release the tongue. It is the former pivot, the load pivot, with which we are now concerned.

In FIGURE 7 the latching surface of the latch plate A is indicated at E and this is inclined forwardly and upwardly at an angle of 88° so that there is a gap between the top edge of the abutment surface F of the tongue B and the latching surface E. Initially, therefore, there is only contact between the bottom edge of the abutment surface F and the latching surface E.

When the buckle is placed under load, e.g. when the wearer of a safety belt is thrown forward as a result of vehicle impact, the contact between the bottom edge of the abutment surface F and the latching surface E is below the pivot D of the latch plate with the result that the latch plate is subjected to a turning moment tending to pivot it away from the base plate C. The latch plate A thus assumes the position shown in FIGURE 8 in which the latching surface E and abutment surface F are coplanar and parallel and in contiguous engagement. The effective load bearing point between the abutment surface F and latching surface E is now at the point indicated at G which is above the pivot D of the latch plate A.

This results in the latch plate now being subjected to a resultant turning moment tending to close it, i.e. to pivot it downwardly between the base plate C.

With the arrangement shown in FIGURES 7 and 8 by suitably angling the latching surface E, the latch plate when the buckle is under load, is subjected to a closing moment so that it cannot accidentally open and disengage from the tongue.

It will be appreciated that it can be arranged for the pivot D of the latch plate to be in alignment with the line of reaction of the load between the abutment surface F and the latching surface E, in which case the latch plate A is subjected to zero torque.

In the arrangements shown in FIGURE 9 the latching surface E is inclined at an angle of 92° so that it extends upwardly and rearwardly from the base plate C and initially contact between the abutment surface F and the latching surface E is along the top edge of the former. Consequently when the buckle is under load, the latch plate is subjected to a turning moment tending to open it, the reaction load between the abutment surface F and the latching surface E being above the pivot point D. It is therefore necessary to employ a spring bias for the latch plate sufficiently strong to counter this opening turning moment.

In some instances the arrangements shown in FIGURE 9 is preferred because it facilitates more ready release of the tongue than does the arrangement shown in FIGURES 7 and 8.

From the foregoing description, and, in particular, upon examining the accompanying drawings it will readily be seen that the safety buckle of the present invention is of very neat and simple external appearance. The overall height of the buckle is only slightly in excess of ½″ and this is a substantial reduction compared with the height of buckles of conventional construction.

What we claim is:

1. A safety belt buckle comprising a housing having a base plate with integral upstanding side walls, a one-piece latch plate overlying said base plate, means between said plates defining a fulcrum for pivotal movement of said latch plate relative to said base plate, said latch plate furtheir including a projection at each side thereof, an abutment shoulder at each side of said base plate and integral therewith, said projections being in engagement with said abutment shoulders whereby said latch plate is restrained from moving in a direction beyond said shoulders by the engagement therebetween, said latch plate having means at one end portion for latchingly engaging a tongue adapted for insertion into said housing between said plates, means normally biasing said latch plate to urge said latching means toward said base plate, and said latch plate having a tail inclined upwardly from the fulcrum of the latch plate and away from said base plate, in a direction opposite to the portion of the latch plate having the latching means, and means for pivoting the latch plate through said tail against said biasing means to move the tongue engaging means away from said base plate.

2. The safety belt buckle as defined in claim 1, in which the housing is of one-piece construction and is defined by said base plate and said upstanding side walls, said upstanding side walls are devoid of apertures, and said abutment shoulders each being integral with an associated side wall.

3. The safety belt buckle as defined in claim 1, wherein said abutment shoulders are defined by down-turned portions of said side walls directed toward said base portion.

4. The safety belt buckle as defined in claim 1, wherein said abutment shoulders are defined by in-turned portions of said side walls in overlying relationship to said latch plate projections.

5. The safety belt buckle as defined in claim 1, wherein said abutment shoulders are defined by in-turned portions of said side walls in overlying relationship to said latch plate projections, and said latch plate projections are directed upwardly toward said abutment shoulders.

6. The safety belt buckle as defined in claim 1, wherein said latch plate includes an edge portion opposite said engaging means inclined upwardly away from said base portion, and said biasing means acts against said edge portion.

7. The safety belt buckle as defined in claim 1, wherein aperture means are provided in said base portion for receiving a strap therethrough, and said base portion is otherwise devoid of additional aperture means.

8. The safety belt buckle as defined in claim 1, wherein an inner edge portion of said latch plate includes said tail inclined away from the base portion, and said pivoting means is operative through the tail of said latch plate for moving the tongue engaging means away from said base portion.

9. The safety belt buckle as defined in claim 1, wherein said base portion includes a transverse slot, and said latch plate includes a leg engaged within said slot thereby serving to hold the latch plate in the housing against withdrawal in a longitudinal direction.

10. The safety belt buckle as defined in claim 1, including a cover plate fitting over the latch plate and secured to the housing, and said biasing means is disposed between said cover plate and said latch plate for normally biasing the latter to urge said latching means toward said base portion.

11. The safety belt buckle as defined in claim 1, including a tongue insertable into the housing between the latch plate and the base plate, the tongue having an abutment surface engageable with a latching surface of the latch plate to lock the tongue against withdrawal, said abutment surface being provided by a face edge of a slot in said tongue and wherein the fulcrum of the latch plate is in alignment with the line of reaction of the resultant load force between the abutment surface of said tongue and the latching surface of said latch plate whereby there is no resultant opening moment acting on the latch plate when the buckle is under tension.

12. The safety belt buckle as defined in claim 1, including a tongue insertable into the housing between the latch plate and the base plate, the tongue having an abutment surface engageable with a latching surface of the latch plate to lock the tongue against withdrawal, said abutment surface being provided by a face edge of a slot in said tongue and wherein the fulcrum of the latch plate is located below the line of reaction of the resultant load force between the abutment surface and the latching surface whereby the latch plate is subjected to a resultant closing moment biasing it for pivotal movement against the base plate when said buckle is under tension.

13. The safety belt buckle as defined in claim 1, including a tongue insertable into the housing between the latch plate and the base portion, the tongue having an abutment surface engageable with a latching surface of the latch plate to lock the tongue against withdrawal, said abutment surface being provided by a face edge of a slot in said tongue, said face edge being at right angles to the faces of the tongue and wherein the latching surface, with the tongue engaged in the housing part, is parallel to the abutment surface of the tongue.

14. A safety belt buckle as defined in claim 1, including a tongue insertable into the housing between the latch plate and the base portion, the tongue having an abutment surface engageable with a latching surface of the latch plate to lock the tongue against withdrawal, said abutment surface being provided by a face edge of a slot in said tongue, said face edge being at right angles to the faces of the tongue and wherein the latching surface, with the tongue engaged in the housing part, is inclined at an angle of no more than 2 degrees from said abutment surface so that the edge of the latching surface remote from the base plate is spaced from the abutment surface.

15. The safety belt buckle as defined in claim 1, including a tongue insertable into the housing between the latch plate and the base portion, the tongue having an abutment surface engageable with a latching surface of the latch plate to lock the tongue against withdrawal, said abutment surface being provided by a face edge of a slot in said tongue, said face edge being at right angles to the faces of the tongue, and wherein the latching surface, when the tongue is engaged in said housing, is inclined away at an angle of no more than 2 degrees from said abutment surface so that the edge of the latching surface adjacent the base edge is spaced from the abutment surface whereby the latch plate is subjected to a resultant opening moment tending to cause pivotal movement of the latch plate away from the base plate when the buckle is under tension, and including means biasing the latch plate toward the base plate, said biasing means being sufficiently strong to counter said opening moment on the latch plate.

16. The safety belt buckle as defined in claim 1, wherein said base portion includes a transverse slot, said latch plate includes an inner edge engaged within said slot thereby serving to hold the latch plate in the housing against withdrawal in a longitudinal direction, and a portion of said biasing means is disposed within said transverse slot.

17. The safety belt buckle as defined in claim 3, wherein said housing includes means defining an entrance opening adapted to slidingly receive a tongue, a pair of pivot portions integrally formed from said upstanding side walls adjacent said entrance opening, and said pivoting means being a depressible plate mounted for pivoting movement relative to said pivot portions.

18. The safety belt buckle as defined in claim 17, including a cover plate secured to said housing and retaining said depressible plate mounted for pivotal movement relative to said pivot portions.

19. The safety belt buckle as defined in claim 18, including an aperture in said cover plate through which said depressible plate can be manipulated to pivot the latch plate to its released position.

20. A safety belt buckle comprising a one-piece housing defined by a base portion and integral upstanding side walls devoid of apertures, a one-piece latch plate overlying said base portion, means between said plates defining a fulcrum for pivotal movement of said latch plate relative to said base portion, said latch plate further including a projection at each side thereof, an abutment shoulder at each side of said base portion integral with an associated side wall, said projections being in engagement with said abutment shoulders whereby said latch plate is restrained from moving in a direction beyond said shoulders by the engagement therebetween, said latch plate having means at one end portion for latchingly engaging a tongue adapted for insertion into said housing between said base portion and latch plate, means normally biasing said latch plate to urge said latching means toward said base portion, and means for pivoting the latch plate against the biasing means to move the tongue engaging means away from said base portion.

21. A safety belt buckle comprising a housing part having a base plate formed with upstanding side walls, a latch plate pivotally mounted to the base plate about a fulcrum provided by an inner end edge of said latch plate transversely disposed across said base plate, said latch plate further including an upstanding projection at each side thereof, an abutment shoulder provided by in-turned portions of said side walls at each side of said base plate, said projections being in engagement with said abutment shoulders, whereby said latch plate is restrained from moving away from said base plate by engagement therebetween, said base plate including a transverse slot, and said latch plate including a leg engaged within said slot, thereby preventing withdrawal of the latch plate from the base plate, the side of the latch plate facing the base plate presenting a latching surface, a tail extending from its inner edge and inclined away from the base plate, said latching surface being on one side of said fulcrum and said tail being on the other side thereof, means biasing the latch plate for pivotal movement to move the latching surface toward the base plate to the housing part, a tongue insertable into the housing part between the latch plate and the base plate, the tongue having an abutment surface engageable with the latching surface to lock the tongue against withdrawal, and manually operable release means acting on the tail to pivot the latch plate against the biasing means thereby effecting movement of the latching surface away from the base plate and out of engagement with the abutment surface of the tongue.

22. A safety belt buckle comprising a housing part having a base plate formed with upstanding side walls, a latch plate pivotally mounted to the base plate about a fulcrum transversely located adjacent an inner end edge of the latch plate and provided by a pair of abutments projecting from the surface of the latch plate facing the base plate, said abutments bearing on the base plate, said latch plate further including a projection at each side thereof, an abutment shoulder provided by down turned portions of the side walls at each side of said base plate, said projections being in engagement with said abutment shoulders whereby said latch plate is restrained from moving in a direction beyond said shoulders by the engagement therebetween, the side of the latch plate facing the base plate presenting a latching surface, and said latch plate having a tail extending from its inner edge and inclined away from the base plate, said latching surface being on one side of said fulcrum and said tail being on the other side thereof, means biasing the latch plate for pivotal movement to move the latching surface toward the base plate of the housing part, a tongue insertable into the housing part between the latch plate and the base plate, the tongue having an abutment surface engageable with the latching surface to lock the tongue against withdrawal, and manually operable release means acting on the tail to pivot the latch plate against the biasing means thereby effecting movement of the latching surface away from the base plate and out of engagement with the abutment surface of the tongue.

References Cited

UNITED STATES PATENTS

| | | |
|---|---|---|
| 3,130,467 | 4/1964 | Davis. |
| 3,165,806 | 1/1965 | Lehman. |
| 3,203,064 | 8/1965 | Murphy. |
| 3,266,110 | 8/1966 | Davis. |
| 3,317,970 | 5/1967 | Van Noord _____ 24—75 |

FOREIGN PATENTS

| | | |
|---|---|---|
| 409,842 | 5/1910 | France. |

BERNARD A. GELAK, *Primary Examiner.*